United States Patent Office 2,941,989
Patented June 21, 1960

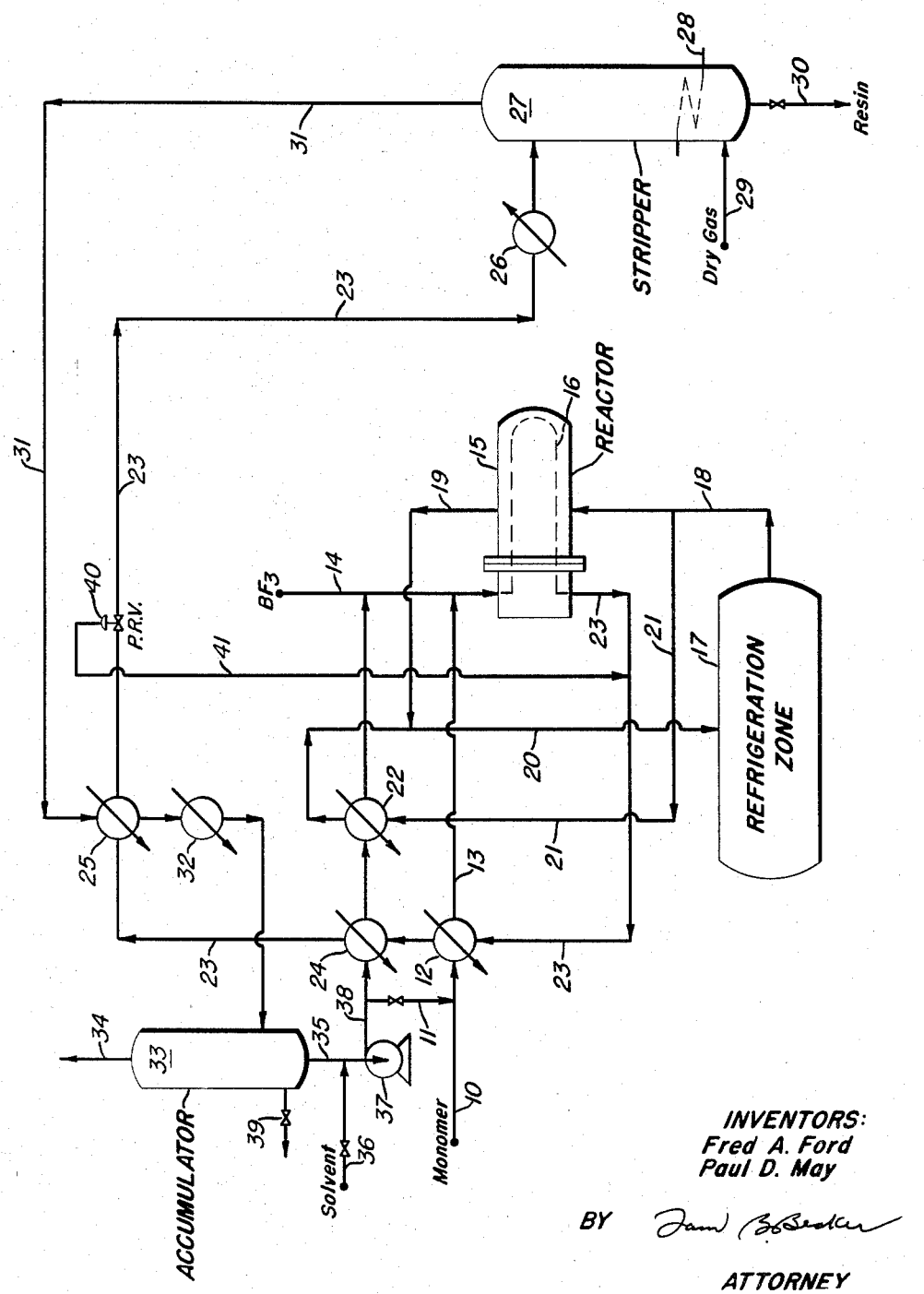

2,941,989

ALPHA-METHYLSTYRENE RESIN PREPARATION

Fred A. Ford, Texas City, and Paul D. May, Galveston, Tex., assignors to The American Oil Company, Texas City, Tex., a corporation of Texas Filed Nov. 27, 1956, Ser. No. 624,529

6 Claims. (Cl. 260—93.5)

This invention relates to a novel process for the polymerization of alpha-methylstyrene to produce a resin particularly suitable for use in the manufacture of floor tile. More specifically, the invention relates to a continuous, homogeneous catalytic process by means of which alpha-methylstyrene is polymerized in an inert aromatic hydrocarbon solvent in contact with dissolved $BF_3$ in a specified concentration range and under other specified operating conditions, which must be carefully controlled and maintained, to produce a resin having a relatively narrow weight average molecular weight range especially suitable for use in the manufacture of the so-called asphalt-type floor tiles.

A typical asphalt-type floor tile is prepared from about 23 weight percent resin mix and 77 weight percent of filler. The resin mix consists of resin and plasticizer and the filler consists of calcium carbonate and asbestos. Manufacturers of floor tile consider indentation characteristics as one of the most important properties of a resin. Experimentally, these characteristics are determined on a McBurney indentation tester with which a 30-pound weight is applied to a ¼-inch diameter steel ball. The depth that the ball penetrates the tile, in mils, is read directly on the instrument scale. Two readings are taken at 77° F.: the first, one minute after the weight is applied, and the second, ten minutes after the weight is applied. The difference between two readings is referred to as the "one-to-ten spread." U.S. Government specifications on asphalt tile, published in 1943, list a range of one-minute indentations of 7 to 18 mils and the corresponding "one-to-ten spread" allowed for each one-minute indentation. In addition to the one- and ten-minute readings, a 30-second reading at 115° F. is also taken. These U.S. Government specifications apply only to tile sold to Federal agencies, but they are widely used as a guide throughout the floor tile industry.

To permit its use in asphalt-type floor tile, a resin must have the desired physical properties when compounded in the finished tile, it must also be resistant to oxidation, it must be readily manufactured in large quantities and it must be cheap. For use in light colored tiles, the resin should be color stable upon exposure to ultraviolet radiation. It is obvious that it is not easy to satisfy all the foregoing requirements and, in fact, various compromises are usually effected in selecting a resin for floor tile use.

Through the process of the present invention, an especially desirable resin can be manufactured readily, economically and in large quantities by a continuous catalytic process of homogeneous polymerization with very small proportions of $BF_3$ catalyst.

One object of this invention is to provide a novel homogeneous catalytic process for the polymerization of alpha-methylstyrene. Another object is to provide a continuous process for the polymerization of alpha-methylstyrene to a resin especially suitable for use in asphalt-type floor tile. Yet another object is to provide a process of the character aforesaid in which alpha-methylstyrene is polymerized with $BF_3$ in solution in an inert aromatic hydrocarbon solvent for the monomer, catalyst and resinous product, in which process a partial pressure of $BF_3$ of at least about 50 p.s.i.g. is maintained over the reaction solution. Yet another object is to provide a continuous catalytic process of the character aforesaid in which said solvent is cumene. These and other objects of our invention will become apparent from the ensuing description thereof.

The prior art reveals that the polymerization of alpha-methylstyrene in the presence of a variety of Friedel-Crafts and other acidic catalysts has been studied. These methods have led to a variety of polymers, ranging from dimers to homopolymers having a weight average molecular weight of about 84,000 (A. B. Hersberger et al., Ind. Eng. Chem. 37, 1073–8 (November 1945); "Cationic Polymerization and Related Complexes," edited by P. H. Plesch, W. Heffer & Sons, Ltd., Cambridge (1953), pp. 80+ and 90+). A considerable effort has been expended in the prior art to convert alpha-methylstyrene to high molecular weight resins at subzero (° C.) temperatures with a variety of Friedel-Crafts catalysts in the presence of various reaction solvents or diluents such as lower alkyl halides, carbon disulfide, polysiloxanes, normal olefins containing 2 to 6 carbon atoms in the molecule and mixtures of these solvents or diluents, in order to secure alpha-methylstyrene resins having high molecular weights (Hersberger et al., supra, and U.S. Patents 2,436,614, 2,472,589, 2,479,618, 2,490,372 and 2,507,338). Only batch processes have been proposed for the polymerization of alpha-methylstyrene to resins having such high molecular weights e.g. about 17,000 to about 72,000, that the resins precipitate from the reaction mixture. Furthermore various prior art processes involve difficult contacting problems, since the catalyst is usually introduced as a spray or mist of the Friedel-Crafts halide in a solvent into a solution of alpha-methylstyrene in a relatively expensive non-hydrocarbon solvent; the resultant mixture is not homogeneous and violent agitation is required to obtain suitable contacting of halide catalyst with alpha-methylstyrene and withdrawal of the heat of reaction.

In no instance known to us has $BF_3$ been employed as a homogeneous catalyst for alpha-methylstyrene polymerization in an inert hydrocarbon solvent under a superatmospheric partial pressure of $BF_3$ sufficient to maintain the necessary concentration of $BF_3$ in solution to produce an alpha-methylstyrene resin. As will become apparent hereinafter, the process of the present invention provides an unexpected, simple and economical method for the continuous polymerization of alpha-methylstyrene to resins which are especially useful for compounding asphalt-type floor tile.

In order to produce a cheap, competitive resin having special application in floor tile, a continuous process must be devised and this object, in turn, is best attainable if homogeneous polymerization can be achieved in a cheap, inert solvent or diluent for monomer, catalyst and resin; if the process can be controlled to produce a resin having a narrow weight average molecular weight range; if the necessity of mechanical stirring equipment can be avoided; if the resin product and used catalyst can be readily separated from said solvent.

To our knowledge, a process having the aforesaid characteristics has never before been proposed or placed in operation. On the contrary, the known processes for polymerization of alpha-methylstyrene have been batch operations involving expensive solvents or diluents, catalysts usually in heterogeneous form and uncontrolled, wide molecular weight range resin production (note, for example, Hersberger et al., supra).

Briefly, we have discovered that alpha-methylstyrene can be substantially quantitatively and continuously polymerized as a dilute solution (about 30 to 40 weight percent) in a substantially inert aromatic hydrocarbon solvent boiling in the gasoline boiling range, particularly cumene, by contact with dissolved $BF_3$ which is present in the reaction solution in a concentration between about 0.25 and about 1 weight percent (based on alpha-methylstyrene) at temperatures between about $-20°$ C. and about $-40°$ C. at reaction periods between about 2 minutes and one hour. An essential feature of our invention is the discovery that a partial pressure of $BF_3$ of at least about 50 p.s.i.g., for example, from about 50 to about 200 p.s.i.g., must be maintained over the reaction solution at the reaction temperature to insure a sufficient concentration of dissolved $BF_3$ in said solution to permit it to function efficiently as a homogeneous catalyst for the polymerization of alpha-methylstyrene. Under the conditions aforesaid, alpha-methylstyrene is quantitatively converted to a resin having a weight average molecular weight between about 700 and 2000, more often about 1000 to 1400. The reaction solution is readily worked up by an extremely simple technique to yield the alpha-methylstyrene resin, aromatic hydrocarbon solvent which can be returned to the continuous polymerization zone and gaseous $BF_3$ which can be recovered for reuse or rejected from the polymerization system, as desired. The invention will be described in more detail hereinafter.

The essential monomer of our polymerization process is alpha-methylstyrene. This can be obtained as a by-product in the process of preparing phenol and acetone by the oxidation of cumene or, more often, as a product of the catalytic dehydrogenation of cumene. Thus, cumene may be dehydrogenated at high temperatures in the presence of steam by contact with alkalized iron oxide catalysts which can be supported or not, as desired. The dehydrogenation effluent of one such process yields a mixture which can be diluted with cumene to produce a solution containing about 30–40 w. percent of alpha-methylstyrene, about 2 w. percent of styrene, and about 4 w. percent each of benzene and toluene, the remainder being cumene; this solution is a desirable feed stock for polymerization. The feed stock for polymerization should be dried, for example by contact with calcium sulfate, activated alumina, activated magnesia or other efficacious drying agents so that the concentration of water therein does not exceed about 100 p.p.m. In general, it is preferable that the feed stock be as free as possible from non-hydrocarbon components, for example, organic compounds of sulfur, nitrogen or oxygen.

Suitable aromatic hydrocarbon diluents for the alpha-methylstyrene boil within the gasoline boiling range (up to about 210° C. at one atmosphere) and include benzene, toluene, xylenes, ethylbenzene, propylbenzene, isopropylbenzene, t-butylbenzene and similar alkyl-benzenes or their mixtures. Cumene serves admirably as a solvent for the monomer, catalyst and resinous polymerization product.

The polymerization catalyst is a solution of $BF_3$ in the aromatic hydrocarbon solvent in the concentration range between about 0.25 to about 1 w. percent, based on the alpha-methylstyrene monomer.

The reaction temperature is selected between about $-20°$ C. and about $-40°$ C. At temperatures above about $-20°$ C., alpha-methylstyrene resins of undesirably low molecular weight are produced in increased proportion in the resin product. At temperatures below about $-45°$ C. the viscosity of the polymer solution becomes so high as to render pumping and handling thereof very difficult or impractical. Close control of the reaction temperature can be effected by various means known in the art. In a continuous polymerization plant it is desirable to maintain temperatures within the aforesaid range by indirect heat exchange, using a suitable refrigerant. Suitable refrigerants are, for example, a cold naphtha fraction or evaporating propylene or a propylene-propane mixture.

In effecting a homogeneous polymerization reaction under the aforesaid conditions of dissolved $BF_3$ concentration, temperature and alpha-methylstyrene concentration in a suitable aromatic hydrocarbon solvent, substantially quantitative (about 98 to 100%) polymerization of alpha-methylstyrene can be effected in remarkably short periods, usually about 2 to 10 minutes, although the reaction period may, in some instances, be extended to 60 minutes. Generally, quantitative polymerization can be effected within the range of about 5 to 10 minutes without necessitating unusual provisions for heat removal from the polymerization reaction zone.

The accompanying figure is an illustrative, non-limitative representation of a suitable polymerization plant.

The monomer, which is essentially alpha-methylstyrene, is charged through line 10 and is blended with a suitable aromatic hydrocarbon solvent such as cumene, entering by line 11, to produce a 30 to 40 w. percent solution of alpha-methylstyrene in said solvent. The resultant solution is passed through a heat exchanger or pre-cooler 12 in indirect heat exchange with the cold reactor effluent, thence through line 13 into line 14 to reactor 15. Boron trifluoride gas is passed into line 14, wherein it is dissolved in an aliquot of the aromatic hydrocarbon solvent under a partial pressure of $BF_3$ ranging from about 50 to about 200 p.s.i.g., sufficient to produce a dissolved $BF_3$ concentration in the liquid reaction mixture in the range of about 0.25 to about 1% by weight, based on the alpha-methylstyrene charged to the reactor.

In the accompanying figure reactor 15 is depicted as a shell and tube heat exchanger, being suitably a multipass heat exchanger. In the interests of simplicity, only one reaction tube, 16, is specifically illustrated, although the actual reactor contains a plurality of reaction tubes. The shell side of the reactor is provided with a refrigerant which passes from a conventional refrigeration zone 17 through line 18 into the shell side of reactor 15, in which the heat produced by the polymerization reaction is removed at a rate sufficient to maintain the required polymerization temperature, thence through line 19 into line 20 for return to the refrigeration unit. Part of the refrigerant is by-passed through line 21 into heat exchanger 22 to precool the aromatic hydrocarbon solvent passing through line 38 to a temperature within the polymerization range.

The reactor tubes can be constructed of ordinary carbon steel, for example ½ in. I. D. by about 20 ft. in length each, through which the reaction mixture is passed at a rate between about 0.4 and about 0.5 foot per second. Under the selected reaction conditions substantially quantitative polymerization of the alpha-methylstyrene occurs to produce a resin well adapted to the manufacture of asphalt-type floor tile. The product resin remains in solution in the selected aromatic hydrocarbon solvent under the reaction conditions.

The pressure in the reactor tubes is controlled by a suitable pressure-regulating valve, for example, a throttle valve 40 located on the reactor outlet line 23 and controlled manually or automatically to maintain the desired pressure within the reaction zone. Thus a hydraulic control line 41 leading from the reactor effluent line 23 may be used to operate pressure-regulating valve 40.

The product solution is withdrawn from reactor 15 through line 23, thence through heat exchangers 12, 24, 25, through pressure reducing valve 40, then through a zone of reduced pressure in line 23, through heat exchanger 26, and then into the upper portion of stripper 27. Heat exchange of reactor effluent is thus effected in turn with monomer solution, aromatic hydrocarbon solvent, hot gases derived from stripping the product resin and a heating medium such as gasoil or the like, which is passed through heat exchanger 26 to furnish preheat for the product stream passing into stripper 27. Stripper 27 may take a conventional form; it is provided at its lower extremity with a heating coil 28 and can be provided, if desired, with suitable packing such as Raschig rings, Berl saddles, jack chain, metal gauze or the like. Stripper 27 can be operated at an average pressure of about 20 p.s.i.g., a bottoms temperature of about 180° C. and a top temperature of about 90° C. A dry inert gas such as methane or natural gas is introduced into the lower portion of the stripper through line 29.

The operation of stripper 27 results in the vaporization of aromatic hydrocarbon solvent and $BF_3$ catalyst residue from the alpha-methylstyrene resin, which is discharged through valved line 30 to storage or to such further refining procedures as may be necessary or desirable, for example, washing with aqueous or alcoholic alkalies, filtration through or percolation with adsorbents such as acid-treated clays, etc. The aromatic hydrocarbon solvent, $BF_3$ catalyst residue and, possibly, low boiling alpha-methylstyrene polymers are removed overhead of stripper 27 through line 31, heat exchanger 25 and water condenser 32 into accumulator 33.

A dry gas stream comprising $BF_3$ and the gas introduced into the lower portion of stripper 27 are removed from accumulator 33 through line 34. This gas stream can be neutralized with alkalies and flared; if desired, $BF_3$ can be recovered from this stream by conventional methods forming no part of this invention and the recovered $BF_3$ can be recycled to the polymerization reactor. All or part of the gas stream from line 34 can be recycled to line 29 for reuse in stripper 27, before or after removal of $BF_3$ therefrom. Used solvent can be rejected from the system, as desired, through valved line 39. Recycle aromatic hydrocarbon solvent is withdrawn from the lower end of accumulator 33 through line 35, wherein it is mingled with fresh solvent entering the system through valved line 36. The solvent is forced by pump 37 through line 38 and valved by-pass line 11 to reenter reactor 15.

Non-limitative, illustrative examples of the process of this invention are as follows.

EXAMPLE 1

The alpha-methylstyrene was produced as a by-product of cumene oxidation to form phenol and acetone. As received, the monomer had a specific gravity (25/4° C.) of 0.9062 and it contained 95 w. percent alpha-methylstyrene, 139 p.p.m. phenol and 2.4 p.p.m. of t-butyl catechol. On ASTM distillation, the initial boiling point was 158° C., the 50 v. percent point was 160.6° C., the 90 v. percent was 161.1° C. and the final boiling point was 180° C. The ASTM color was one. This monomer was contacted with Drierite (calcium sulfate) in the proportion of 2 lbs. of monomer per lb. of Drierite to remove the antioxidant and was then diluted with cumene to provide an alpha-methylstyrene concentration in the resultant solution of 32 w. percent. The monomer solution was then precooled by indirect heat exchange with cold naphtha to −40° C. and $BF_3$ was absorbed therein to a concentration of 0.25 w. percent, based on the alpha-methylstyrene concentration in the solution. The reaction mixture was then passed through a carbon steel coil, indirectly cooled by cold, heavy naphtha and polymerization was initiated at −40° C. while maintaining an average back pressure of 100 p.s.i.g in the reaction coil by manual adjustment of a throttle valve on the polymer effluent line. The linear flow rate of the reaction mixture was 0.174 foot per second and total residence time in the reactor was 4.07 minutes. The gravity of the resulting polymer solution averaged 20.5° A.P.I. at 60° F./60° F., compared with 29.9° A.P.I. of the feed solution. The resin solution was stripped with dry natural gas to yield finished resin in excess of 99 w. percent of the alpha-methylstyrene charged to the reactor. The ring and ball softening point of the resin was 121.1 to 126.7° C. (250–260° F.) and the 60% Gardner viscosity (60 w. percent resin in toluene) was X+. The Gardner color of the resin was 2.

EXAMPLE 2

A feed stock containing 30 w. percent alpha-methylstyrene, 2 w. percent styrene, 4 w. percent each of benzene and toluene, and the remainder cumene was used to prepare a further supply of alpha-methylstyrene resin. The reactor was a coil of carbon steel tubing of ⅜-inch diameter with a wall thickness of 0.035-inch and length of 42.54 feet. The reaction coil was preceded by a precooling coil in which the polymerization feed stock was precooled by indirect heat exchange with cold circulating heavy naphtha to the reaction temperature. The pressure in the reaction coil was controlled manually by a throttle valve in the reactor effluent line. The polymerization feed stock was precooled to −40° C. and was introduced into the reaction coil at the rate of 150 cc. per minute. The precooled feed was mixed with gaseous $BF_3$ under pressure to a $BF_3$ concentration of 0.25 w. percent on total olefins in the feed. The velocity of feed through the reaction coil was 0.174 foot per second. By suitable manipulation of the throttle valve in the reactor effluent line, the pressure in the reactor (due largely to $BF_3$) was held at 100 to 150 p.s.i.g. The total residence time of the feed in the reaction coil was 4.07 minutes. Under these conditions complete polymerization of the alpha-methylstyrene and styrene was obtained. The solvent and catalyst residue were stripped from the polymer solution as shown in the accompanying figure. The resultant resin had the physical properties shown in the following table:

*Physical properties of alpha-methylstyrene resin*

| | |
|---|---|
| Softening point, ring and ball | 248° F. |
| Iodine number | Nil. |
| Molecular weight | 762. |
| Color, Gardener of 50% solution | 6. |
| Color, coal tar scale | Less than ½. |
| Viscosity, Gardner-Holdt of 60% solution in toluene | T+. |
| Cloud point | 255° F. |
| Acid number | Nil. |
| Saponification number | Nil. |

The alpha-methylstyrene resin thus prepared was blended with scrap polystyrene and a commercial hydrocarbon plasticizer oil (Socony-Mobil Sovaloid K, registered trademark) in the proportions shown in the following table. Tile indentation tests were made by the method hereinbefore described, for comparison with U.S. Government indentation specifications. The following composition was used and results were obtained:

TABLE.—TILE TESTS

| Composition | | Tile Indentation, mils | U.S. Government Indentation Specifications, mils |
|---|---|---|---|
| Component | Wt. percent | | |
| Poly-alphamethylstyrene | 60.0 | 1 Min. (77° F.) 9.1 | 9.0 |
| Scrap Polystyrene | 8.5 | 10 Min. (77° F.) 13.9 | 14.0 |
| Sovaloid K | 31.5 | 30 Sec. (115° F.) 24.0 | 36.0 |

The heat stability of the alpha-methylstyrene resin is illustrated by the following experiment. Alpha-methylstyrene was heated at 400° F. and held at this temperature for four hours. This heated resin was then compared to the original by compounding both resins into identical tile formulas. The binder used was a mixture of resin and Sovaloid K, thus giving a system that is particularly sensitive to differences in resin. The McBurney tile indentations were:

Tile No. 1 prepared with original resin—
    8.0 mils, 1 minute at 77° F.
    14.1 mils, 10 minutes at 77° F.
    32.0 mils, 30 seconds at 115° F.

Tile No. 2 prepared with resin which had been heated at 400° F. for four hours—
    7.3 mils, 1 minute at 77° F.
    13.3 mils, 10 minutes at 77° F.
    29.0 mils, 30 seconds at 115° F.

The alpha-methylstyrene resins produced by the process of the present invention can be applied for many other purposes than the formulation of asphalt-type floor tiles, for example, in the formulations of adhesives, paints, varnishes or other coatings, addition agents to lubricating oils, addition agents to natural and synthetic rubbers, etc.

Having thus described our invention, what we claim is:

1. In a continuous, homogeneous polymerization process for the preparation of an alpha-methylstyrene resin having a weight average molecular weight in the range of about 700 to about 2,000 especially suitable for floor tile manufacture, the steps of flowing a substantially anhydrous solution of alpha-methylstyrene in a concentration between about 30 and about 40 weight percent in an inert aromatic hydrocarbon solvent through a polymerization reactor at a reaction temperature between about −20° C. and about −40° C. in contact with $BF_3$ dissolved in said solvent in a concentration between about 0.25 and about 1 weight percent, based on alpha-methylstyrene, under a $BF_3$ partial pressure of at least about 50 p.s.i.g. and sufficient to maintain said dissolved $BF_3$ concentration in said solvent, effecting polymerization of said alpha-methylstyrene while withdrawing the heat generated by said polymerization at a rate sufficient to maintain said reaction temperature, continuing said polymerization for a period between about 2 and about 60 minutes sufficient to polymerize said alpha-methylstyrene quantitatively and withdrawing the homogeneous solution thus produced through a pressure-reducing zone.

2. The process of claim 1 wherein gaseous $BF_3$ is dissolved in said aromatic hydrocarbon solvent after the solvent has been precooled to the polymerization reaction temperature and the resultant $BF_3$ solution is contacted with a precooled solution of alpha-methylstyrene in said aromatic hydrocarbon solvent at said reaction temperature.

3. The process of claim 1 wherein said aromatic hydrocarbon solvent is cumene.

4. The process of claim 3 wherein polymerization is effected for a period between about 3 and about 10 minutes.

5. The process of claim 1 which includes the additional steps of stripping $BF_3$ catalyst and said inert solvent by the application of heat and an inert stripping gas to the reaction product in a zone following said pressure-reducing zone.

6. The process of claim 1 wherein said aromatic hydrocarbon solvent is toluene.

References Cited in the file of this patent

UNITED STATES PATENTS

| | | |
|---|---|---|
| 2,485,454 | Nelsen et al. | Oct. 18, 1949 |
| 2,702,288 | Hoeksema et al. | Feb. 15, 1955 |
| 2,768,147 | Meis et al. | Oct. 23, 1956 |

OTHER REFERENCES

Boundy-Boyer: Styrene, etc., page 703 (1952), Reinhold Publishing Corp.